July 8, 1930. A. F. SHORE 1,770,046
APPARATUS FOR MEASURING THE HARDNESS OF MATERIALS
Filed April 4, 1925
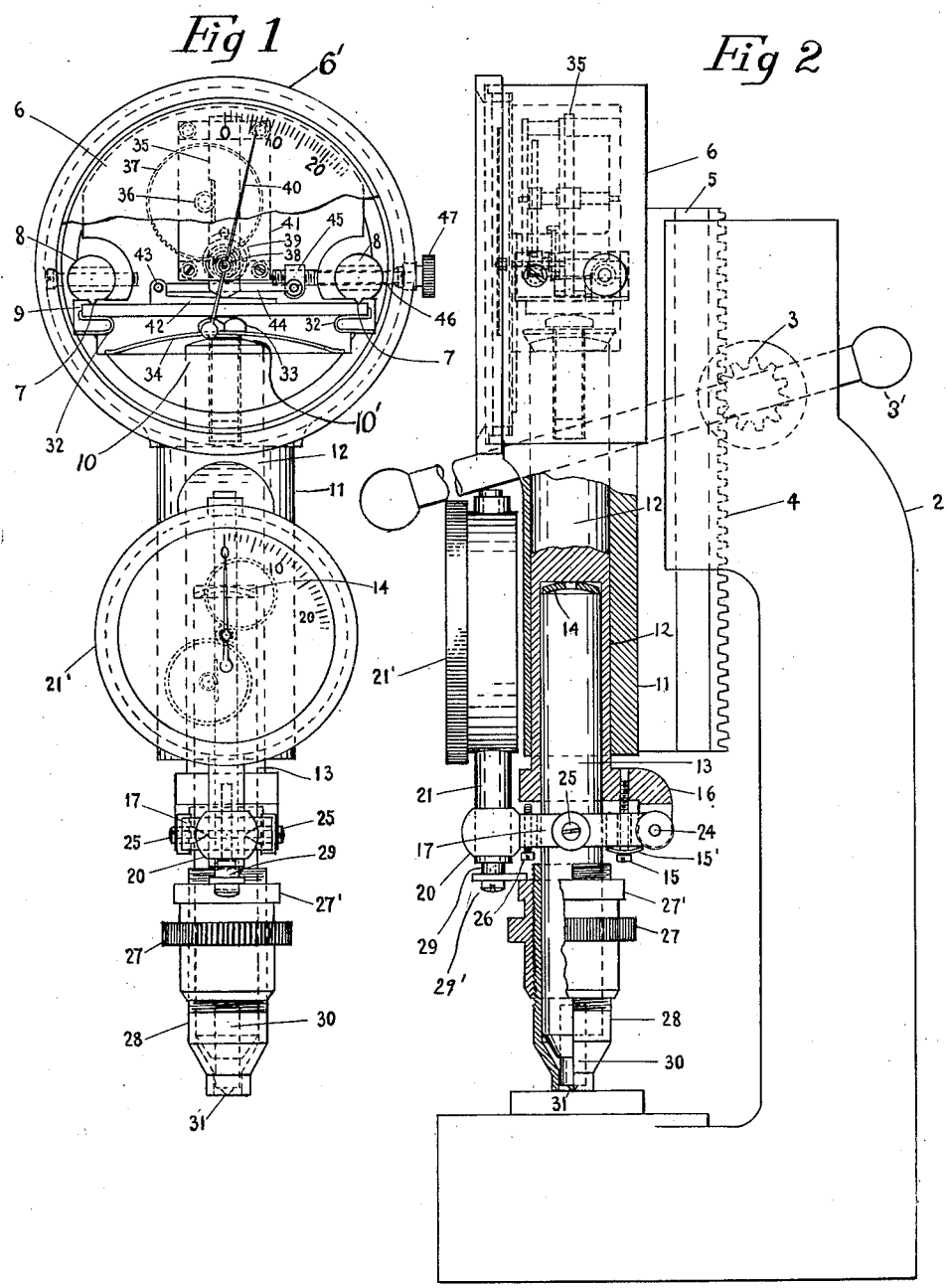

UNITED STATES PATENT OFFICE

ALBERT F. SHORE, OF NEW YORK, N. Y., ASSIGNOR TO THE SHORE INSTRUMENT & MFG. CO., OF JAMAICA, NEW YORK, A CORPORATION OF NEW YORK

APPARATUS FOR MEASURING THE HARDNESS OF MATERIALS

Application filed April 4, 1925. Serial No. 20,599.

This invention relates to improvements in apparatus for measuring or indicating the degree of penetration resistance of materials and particularly the degree of penetration resistance or hardness of materials of the harder grade, whether of organic or inorganic nature.

The present invention is an improvement upon a series of other inventions beginning with the device shown, described and claimed in a joint application of Albert F. Shore and William F. Shore, filed October 9, 1924, Serial No. 742,516, and upon two other joint applications of Albert F. Shore and Charles P. Shore, filed February 24, 1925, Serial No. 10,995 and March 16, 1925, Serial No. 15,727.

The present invention has to do with certain refinements of the micrometer depth-measuring means which have formed important features of the two last-named applications. It was the object of the inventors in those applications—which embody what may be regarded as static hardness-testers—to thus produce hardness readings which, without special manipulation, would accurately agree, particularly on the harder metals, with the readings of the drop-and-rebound principle scleroscope, now in general and successful use. The relation of the drop-and-rebound scleroscope to the absolute hardness scale is of a sliding gradient. Necessarily, the improved static-testers above referred to have a similar sliding scale relation, meaning that while all the indentations, ranging from those in the softest metals to those in the hardest steels, are of nearly the same depth, they are not of exactly the same depth, being slightly less and less as the harder metals are tested. This is due to a slight amount of compression or shortening of the diamond or superhard point and the indentor-bar in the lower end of which it is mounted, relatively to the fixed position of the depth-measuring micrometer. The indentations referred to may be made all of exactly the same depth for the softest as well as for the hardest of metals, by special methods of manipulation, such as by releasing the pressure on the indentor-bar and the indentor-bar point a few times, with the object of measuring the depth of the permanent indentation after finally releasing the pressure on said indentor-point.

In the present invention, it is the main object to produce uniform depth of penetration or indentation for all the metals by one operation or compressive action of the device, and this is accomplished preferably by the use of yieldable or elastic compensating means interposed between the upper and lower sections of a telescopic indentor-bar, with the aid of an adjustable depth-measuring sleeve which normally rests upon and retains a fixed relation to the surface of the specimen under test, and with the further aid of apparatus for applying pressure to said indentor-bar, and micrometer gages for registering the pressure upon the indentor-bar point, as well as the exact depth of penetration of said point in the various metals under test.

The above and other objects of the invention not hereinbefore referred to, will be hereinafter fully described and claimed, and are illustrated in the accompanying drawing forming part of this application, and in which:

Figure 1 is a front elevation, partly broken away, of the preferred embodiment of my new and improved apparatus for testing the hardness of materials and for ascertaining or measuring the degree of penetration resistance thereof, and illustrating the same as applied to a movable pressure-gage; and Fig. 2 is also an elevation, in full and dotted lines, partly in cross-section, showing a side view of the invention.

Referring to the drawing, 2 designates a press-frame or support, 3 a pinion mounted thereon, 3' a fulcrum lever for actuating said pinion, 4 a rack on the dove-tail slide-bar 5, 6 a pressure-gage carried by said slide-bar, said pressure-gage having interior knife-edges 7 formed on revolvable cylindrical hardened pieces 8, which are designed for the purpose of permitting approach or separation of said knife-edges relative to each other in order to provide adjustments of the length, and therefore of the power, of a plate or weighter spring 9. This spring 9, when flexed, communicates its pressure to an indentor-bar 10. At 11 there is shown a sleeve-bearing which surrounds the telescopic indentor-bar 10. The indentor-bar 10 has an outer sleeve section or portion 12 and an inner shaft section or portion 13, slidably mounted in the sleeve section 12. This shaft portion may be solid. The shaft portion is provided at its upper end with yieldable compensating means 14 interposed between said upper part or section 13 and a socket in the lower part of the sleeve section 12 of the indentor-bar 10. It is to be understood, however, that the desired effect may be obtained by making the upper part of the shaft section 13 itself compressible to the microscopic degree desired, and that this result may be accomplished in any other suitable practical manner. For holding the shaft portion 13 in contact with the yieldable compensating means 14 at the upper end of the said shaft and also for adjusting the tension of said means, herein illustrated in the form of a stiff spring, an adjustable screw 15 and a small but stiff spring 15' interposed between said screw and the lever 17, are provided. This lever 17, or its equivalent, is pivotally held by a bracket 16 attached to or integral with the slidable sleeve section 12. The lever 17 is actuated by the shaft portion 13, through the medium of the trunnion screws 25, or their equivalent, intermediate the ends of said lever. The free extremity of the lever 17 is provided with an enlarged portion 20 for holding rigidly the outer stem 21 of a depth-gage or micrometer 21'. The lever 17 is pivotally mounted in the bracket 16 and held in place by a pin 24. Although lever 17 has only a microscopic movement, the opening in the bracket 16 may be made slightly larger than the pin 24, to accommodate any lateral thrusts set up, as when fixed by trunnions to the shaft portion 13. For forming direct contact between lever 17 and the sleeve portion 12 of the indentor-bar 10, a set-screw 26, or its equivalent, is provided to permit cutting out of or entirely eliminating at will the compensating action of the spring means 14, should this be desired. 27 is an adjustable internally screw-threaded collar carried by a sleeve 28 having external screw-threads, the lower end of the sleeve normally resting upon or having a fixed relation with the surface of the test specimen, while the upper part of the collar 27 contacts with a portion 29' on the lower end of the movable inner stem or rack-bar 29 of the depth-gage 21', and the indicator-hand of the depth-gage may thus always be set to zero. 30 is a stem inserted at the lower end of the shaft section or portion 13 of the indentor-bar 10, and in which stem 30 there is mounted an indentor-point 31 of superhard material, or it may be a diamond point or jewel point. In the pressure-gage 6, small springs 32 are provided for holding the plate-spring 9 in contact with the knife-edges 7 and also for holding said spring floatably central relative to the circular casing 6' of the pressure-gage and the indentor-bar 10, respectively. This indentor-bar 10 is provided with a suitable semi-curved top 10' for centrally contacting with the under surface of the plate-spring 9. For holding the indentor-bar floatably but normally out of contact with the plate-spring 9, the spring 34 is provided and which spring is held in place within the walls of the casing 6' in any suitable manner and under the head of screw 33 at the top of the indentor-bar 10. 35 is a slidable rack-bar, meshing with the gear-train 36—37—38, and 39 is an opposer spiral hair-spring which is attached to the pinion 38, the latter carrying and actuating the indicator-hand 40, all mounted in a suitable frame 41 fastened within the casing 6'. The rack-bar 35 does not contact with the plate-spring 9 directly but through the instrumentality of an interposed wedge 42, or its equivalent, provided with a lug and eye 43. This wedge is connected through a rod 44 with a non-revolvable nut 45, threaded on to a longitudinally-fixed screw 46, terminating in a thumb-nut 47 on the outside of the casing 6'. The function of the wedge 42 and thumb-nut 47 is to provide means for setting the indicator-hand 40 of the pressure-gage 6 to zero, as is customary in micrometer gear-train gages of this description. When pressure is applied to the slide-bar 5 by the lever 3' through the pinion 3 and rack 4, it is communicated to the casing of the pressure-gage 6 carried by the slide-bar, thence to the hardened pieces 8, knife-edges 7, to the plate-spring 9 which rests on the upper end of the indentor-bar 10. The pressure is then communicated through the sleeve section through the spring means 14 to the indentor-shaft portion 13, thence to the stem 30 and indentor-point 31 thereof to the specimen under test.

The operation is as follows: When pressure is applied to the test specimen as above explained, it can only be done, unless otherwise specially provided for, through the medium of the interposed spring means 14. Under extremely light pressures, no appreciable amount of flexure occurs in the spring means 14; that is, the depth-gage 21', in its relation to the adjustable sleeve 28, is substantially fixed; therefore, when the indentor-point 31 penetrates the test specimen, it moves relatively to the sleeve 28 and the depth-gage 21' will automatically indicate this motion without interference. Should a harder test specimen, however, be encountered, requiring greater pressure to cause a similar depth of penetration, the spring means 14 will be correspondingly flexed, with the result that, relative to the shaft or solid portion 13, the sleeve portion 12 of the indentor-bar 10 will descend, pressing down the lever 17 through bracket 16 and raising the opposite end of said lever 17 by virtue of its fulcrum center resting upon the shaft portion 13 of said indentor-bar 10. The depth-gage 21′ is carried by the free end of lever 17, so that when under increased pressure the spring 14 correspondingly flexes and the shaft portion telescopes the sleeve portion of the indentor-bar 10, the micrometer 21′ is elevated and recedes from the contacting surface of the adjustable internally screw-threaded collar 27 carried by the adjustable externally screw-threaded sleeve 28; or, in other words, the distance between the said sleeve and the depth-gage micrometer is increased. At the same time, the sleeve 28 retains a fixed relation with the surface of the specimen under test. The result of this recession of the micrometer depth-gage 21′ from the sleeve 28 which actuates it, is that the depth-gage records a lower reading in depth-penetration values than the harder specimen calls for. This, in turn, calls for extra pressure to be applied to the indentor-bar point 31, as above described, to cause the desired depth of penetration and also for eliminating the errors resulting from the shortening or compression of the jewel-point 31 and the indentor-bar 10 in its length between the point of micrometer depth-gage attachment and that of contact with the specimen being tested. Inasmuch as most of the shortening is in the jewel-point of the indentor-bar, compensation cannot be fully obtained by shortening the distance of the connections named. For certain purposes, however, for example, as obtaining scleroscope values direct, the compensating feature is not necessary or desirable. In this event, the screw 26 is brought to bear against the lower end of the sleeve portion 12 of the indentor-bar 10, thus forming a rigid connection and eliminating the spring means 14. The lever 17 is thus held in rigid contact with the lower end of the sleeve portion 12, by the adjustable screw 15 pressing against the small spring 15′, contacting with the underside of said lever 17, said screw 15 being threaded into the bracket 16 at the lower end of the sleeve portion 12. In any event, the indicator-hand of the depth-gage micrometer 21′ is always set to zero through the instrumentality of the adjustable collar 27 acting directly on the depth-gage through the slidable inner stem or rack-bar 29.

Having thus described the lower mechanism concerned with the measurement of depth of penetration, and now referring to the pressure gage, after bringing indentor-point 31 into very light contact with the test specimen, the top 10′ of the indentor-bar 10 is at first out of contact with the plate-spring 9. The indicator-hand 40, of the pressure-measuring gage is, in the meantime, set to zero through the instrumentality of the thumb-screw 47 and its associated parts. This thumb-screw is threaded in a non-rotatable nut 45 in the interior of the casing 6′. The nut 45 is connected through the medium of a flexible rod 44 with the wedge 42 which wedge moves back and forth on the plate-spring 9, thus permitting altering the distance between the upper surface of said spring and the rack-bar 35. Said rack-bar 35, acting on the pinion 36, fixed to the spindle of the gear 37, communicates this motion to pinion 38, fixed to a spindle carrying both the indicator-hand 40 and the opposer hair-spring 39. Said opposer hair-spring exerts a mild pressure through the gear-train described, always keeping the rack-bar 35 in contact with the wedge and the wedge with the upper surface of plate-spring 9.

What I claim is:

1. The combination with a press-frame, a slide-bar on and movable relatively thereto and having a sleeve-bearing, and a pressure-gage carried by the slide-bar, of an indentor-bar in and movable relatively to the sleeve-bearing and consisting of two portions movable relatively to each other, one of said portions effective for operating the pressure-gage and the other portion carrying an indentor-point, and a depth-gage carried on and operated by means of said indentor-bar.

2. The combination with a press-frame, a slide-bar on and movable relatively thereto and having a sleeve-bearing, and a pressure-gage carried by the slide-bar, of an indentor-bar in and movable relatively to the sleeve-bearing and consisting of two portions slidable longitudinaly relatively to each other, one of said portions effective for operating the pressure-gage and the other portion carrying an indentor-point, yieldable compensating means between said two portions, and a depth-gage carried on and operated by means of said indentor-bar.

3. The combination with a press-frame, a slide-bar on and movable relatively thereto and having a sleeve-bearing, and a pressure-gage carried by the slide-bar, of a telescopic indentor-bar in and movable relatively to the sleeve-bearing and consisting of two portions, one of which is movable longitudinally within the other, one of said portions effective in operating the pressure-gage and the other portion carrying an indentor-point, and a depth-gage carried on and operated by means of said indentor-bar.

4. The combination with a press-frame, a slide-bar on and movable relatively thereto and having a sleeve-bearing, and a pressure-gage carried by the slide-bar, of an indentor-bar in and movable relatively to the sleeve-bearing and consisting of two portions movable relatively to each other, one of said portions effective for operating the pressure-gage and the other portion carrying an indentor-point, a spring interposed between said two portions and responsive to variations in pressure exerted on said indentor-bar, and a depth-gage carried on and operated by means of said indentor-bar.

5. The combination with a press-frame, a slide-bar on and movable relatively thereto and having a sleeve-bearing, and a pressure-gage carried by said slide-bar, of an indentor-bar embodying a sleeve portion in and movable relatively to said sleeve-bearing and effective in operating the pressure-gage, and a portion slidable within said sleeve portion and carrying an indentor-point, and a depth-gage carried on and operated by means of said indentor-bar.

6. The combination with a press-frame, a slide-bar on and movable relatively thereto and having a sleeve-bearing, and a pressure-gage carried by said slide-bar, of an indentor-bar in and movable relatively to the sleeve-bearing and consisting of two portions movable relatively to each other, one of said portions effective for operating the pressure-gage and the other portion carrying an indentor-point, a depth-gage carried and operated by means of the indentor-bar, and means adapted to contact with the specimen being tested and effective to set the depth-gage to zero.

7. The combination with a press-frame, a slide-bar on and movable relatively thereto and having a sleeve-bearing, and a pressure-gage carried by said slide-bar, of an indentor-bar having a portion in and movable relatively to the sleeve-bearing and a portion carrying an indentor-point, a lever carried by one of said indentor-bar portions and movable by means of said other indentor-bar portion, and a depth-gage carried by the lever and adapted to operate by relative movement of said indentor-bar portions and to indicate depth of penetration of said indentor-point.

8. The combination with a press-frame, a slide-bar on and movable relatively thereto and having a sleeve-bearing, and a pressure-gage carried by said slide-bar, of an indentor-bar in and movable relatively to the sleeve-bearing and having an indentor-point, a depth-gage carried by the indentor-bar and adapted to indicate depth of penetration of said indentor-point, a sleeve surrounding the lower part of the indentor-bar, having a screw-thread and adapted to engage the specimen being tested, and an adjustable screw-threaded member on the screw-thread of said sleeve and adapted for engagement with said depth-gage and effective in setting the same to zero.

9. The combination with a press-frame, a slide-bar on and movable relatively thereto and having a sleeve-bearing, an indentor-bar in and movable relatively to the sleeve-bearing and having an indentor-point, a pressure-gage carried by said slide-bar and adapted to indicate the amount of pressure applied to said bar and having means for setting said gage to zero, a depth-gage carried by the indentor-bar and adapted to indicate the depth of penetration of said indentor-point, a sleeve surrounding the lower part of the indentor-bar, having external screw-threads and adapted to engage the specimen being tested, and an adjustable internally screw-threaded member on the screw-threads of said sleeve and adapted for engagement with said depth-gage and effective in setting the same to zero.

10. The combination with a press-frame, a slide-bar on and movable relatively thereto and having a sleeve bearing, and a pressure-gage carried by the slide-bar, of a telescopic indentor-bar in and movable relatively to the sleeve-bearing and consisting of an outer and an inner portion slidable longitudinally relatively to each other, the outer portion effective for operating the pressure-gage and having a bracket at its lower end and the inner portion carrying an indentor-point, yieldable compensating means between said two portions, a lever having a free end provided with an enlarged portion and pivotally connected at its other end to the bracket of the outer portion of the indentor-bar and by trunnions to the inner portion of the indentor-bar, means for holding the inner portion of the indentor-bar in contact with said yieldable compensating means and for adjusting the tension of said means, and a depth-gage carried by the enlarged portion of the free end of said lever and operated by means of the indentor-bar.

11. The combination with a press-frame, a slide-bar on and movable relatively thereto and having a sleeve-bearing, and a pressure-gage carried by the slide-bar, of a telescopic indentor-bar in and movable relatively to the sleeve-bearing and consisting of an outer and an inner portion slidable longitudinally relatively to each other, the outer portion effective for operating the pressure-gage and having a bracket at its lower end and the inner portion carrying an indentor-point, yieldable compensating means between said two portions, a lever having one end free and the other end pivotally connected to the said bracket and its central portion by trunnions to the inner portion of the indentor-bar, means for eliminating the yieldable compensating means and for forming direct contact between the lever and the outer portion of the indentor-bar, and a depth-gage carried by the free end of the lever and operated by means of the indentor-bar.

12. A telescopic member consisting of an outer section and an inner section, one slidable within the other, elastic compensating means interposed between said sections, and means for holding the inner section in contact with the elastic compensating means and for adjusting the tension of said means.

13. A telescopic member consisting of two portions, one of which is movable longitudinally within the other, yieldable compensating means interposed between said portions, means for holding one portion in contact with the yieldable compensating means and for adjusting the tension of said means, and means for eliminating at will the said yieldable compensating means and for forming rigid contact between said two members of the telescopic member.

14. A telescopic member consisting of an outer section having a bracket at its lower end and an inner section movable in the outer section, elastic compensating means interposed between said sections, a lever fastened at its central portion to the inner section of the telescopic member by trunnions and at one end pivotally to said bracket, and means for holding the said inner section in contact with the elastic compensating means and for regulating the tension of said means.

15. A telescopic member consisting of two portions, one of which is movable longitudinally within the other, a stiff spring interposed between said portions, a bracket attached to one portion, a lever attached to the other portion and also pivotally connected to the said bracket, an adjustable screw, and a stiff member interposed between said screw and the lever for holding one portion of the telescopic member in contact with the said stiff spring and for regulating the tension of said spring.

16. In a device of the class described, the combination with a press-frame having means for exerting pressure, a pressure-gage associated therewith and having a weigher-spring, of an indentor-bar in and movable relatively to said gage when actuated by said spring, said indentor-bar comprising an outer sleeve, a shaft slidable therein, said shaft having a pointed end, and elastic means interposed between said sleeve and shaft, said means being responsive to variations of pressure exerted by the press-frame upon said sleeve and shaft, a depth-gage for indicating exact depths of penetration of the pointed end in various materials, and means connected to the indentor-bar and said depth-gage for actuating the latter.

17. In a device of the class described, the combination with a press-frame having means for exerting pressure, a pressure-gage associated therewith and having a weigher-spring in said gage, of an indentor-bar having an indentor-point and floatably carried by and movable relatively to said gage when actuated by said spring for recording variations of pressure on the said bar, said indentor-bar having an outer sleeve portion and a shaft movable in a socket therein, yieldable means in said socket interposed between said shaft and sleeve and being responsive to variations of the pressure exerted by the press-frame upon the said two members, a depth-gage for indicating the depth of penetration of the indentor-bar and carried by means of the same, and means interposed between the depth-gage and the test specimen for actuating said gage.

18. In a device of the class described, the combination with a press-frame having means for exerting pressure, a pressure-gage associated therewith and having a weigher-spring, of an indentor-bar adapted to indicate variations of pressure when actuated by said spring, said bar comprising an outer sleeve portion and a shaft portion movable therein, said shaft portion being provided with a pointed lower extremity, means connected to the indentor-bar to indicate depth of penetration of the indentor-point, and yielding compensation means interposed between said sleeve and said shaft adapted to be actuated by said indentor-bar for eliminating errors of depth indication due to shortening of said indentor-bar and its pointed extremity under pressure by the press-frame and its associated parts.

19. In a device of the class described, the combination with a press-frame having means for exerting pressure, a pressure-gage associated therewith and spring means in said gage, an indentor-bar slidable in said gage and movable relatively thereto when actuated by said spring means, said bar comprising telescopic inner and outer portions, a superhard point at the lower end of said bar, a yielding member interposed between the telescopical portions of the indentor-bar, said member being responsive to variations of pressure exerted upon said bar by the press-frame, a lever pivoted on one of said portions of the indentor-bar and having its fulcrum on the other of said portions, a depth-gage carried by the free end of said lever, and means for actuating said gage, including a member to contact with the test specimen.

20. In a device of the class described, the combination with a press-frame, a slide-bar carried thereby and movable therein, means carried by the slide-bar having a weigher-spring, of an indentor-bar carrying an indentor-point and slidable in said last-named means and adapted to be actuated by said spring for recording variations of pressure on said indentor-point, said bar consisting of a hollow portion and a solid portion slidable therein, yieldable means interposed between said solid and hollow portions, means including a lever for regulating the tension of said yieldable means, said lever being actuated by relative movements between the solid and hollow portions of said indentor-bar, a depth-gage rigidly attached to the free end of the lever, a member for setting said gage to zero, an adjustable sleeve surrounding the lower end of the indentor-bar and adapted to retain a fixed relation to or to rest upon the surface of a test specimen, and means for applying pressure to the indentor-bar and its associated parts for actuating the pressure-gage and the depth-gage.

21. In a device of the class described, the combination with a press-frame, a slide-bar carried thereby and movable therein, a pressure-gage carried by the slide-bar and having a weigher-spring, of an indentor-bar slidable in and movable relatively to said gage adapted to be actuated by said spring, said bar comprising an outer sleeve portion and a shaft portion slidable therein and carrying an indentor-point at its lower end, a stiff spring interposed between said sleeve and shaft portions, means for varying the pressure upon said stiff spring, means for indicating the depths of penetration of the indentor-point in various materials, internally screw-threaded means for setting said last-named means to zero, an externally screw-threaded sleeve resting upon or in fixed relation with the surface of a test specimen, and means for applying pressure to the indentor-bar for actuating the pressure-gage and the depth-gage and their associated parts.

22. In a device of the class described, the combination with a press-frame, a slide-bar carried thereby and movable therein, a pressure-gage carried by the slide-bar and having a plate-spring, said gage being responsive to variations of pressure exerted upon said plate-spring and having indicating means and means for adjusting the said indicating means to zero, of an indentor-bar slidable in said gage and movable relatively thereto when actuated by said spring, said bar comprising an outer portion and a shaft portion slidable therein and carrying a superhard point, resilient means interposed between said sleeve and shaft portions, respectively, said means being responsive to variations of pressure exerted on said sleeve portion, a depth-gage having indicating means for indicating the depths of penetration of the superhard point and means for adjusting the said indicating means to zero, a sleeve surrounding the lower end of the indentor-bar, and pressure means for actuating the pressure-gage and the depth-gage and their associated parts.

23. In a device of the class described, the combination with a press-frame, a slide-bar carried thereby and movable therein, a pressure-gage carried by the slide-bar and having a plate-spring and means for indicating pressures on said plate-spring including a rack-bar, a gear-train, an indicator-hand, a wedge interposed between said plate-spring and rack-bar and means for setting said indicating means to zero, of an indentor-bar slidable in said gage and movable relatively thereto when actuated by said spring, said bar comprising an outer sleeve portion and a shaft portion slidable therein and carrying an indentor-point, a yieldable member interposed between said sleeve and shaft portions, said member being responsive to variations of pressure exerted upon said sleeve portion, a micrometer-gage adapted to indicate exact depths of penetration of the indentor-point in various materials and having means for setting same to zero, and pressure means for actuating the pressure-gage and depth-gage, respectively, and their associated parts.

24. In a device of the class described, the combination with a press-frame, a slide-bar carried thereby and movable therein, a pressure-gage carried by the slide-bar and having a plate-spring therein, of an indentor-bar slidable in said gage and movable relatively thereto in the actuating of said spring, said indentor-bar comprising an outer sleeve portion having a bracket at its lower end and a shaft portion slidable in said sleeve portion, a stiff spring interposed between said shaft and sleeve portions, said spring being responsive to variations of pressure exerted upon said sleeve member, a lever attached to and actuated by relative movements of the sleeve and shaft portions of the indentor-bar due to shortening under pressure of the interposed spring, an adjustable screw and spring means interposed between the bracket of said outer sleeve portion of the indentor-bar and said screw for holding the shaft portion of the indentor-bar in resilient contact with the stiff spring and for varying the tension of said spring, and a micrometer-gage carried by said lever for indicating with exactness the depth of penetration of the pointed shaft portion of the indentor-bar when various materials are under test.

25. In a device of the class described, the combination with a press-frame, a slide-bar carried thereby and movable therein, a pressure-gage carried by the slide-bar and having a plate-spring, of an indentor-bar slidable in said gage and movable relatively thereto in the actuating of said spring, the said bar comprising an outer sleeve portion with a bracket at its lower end and a pointed shaft portion movable in the outer sleeve portion, a stiff spring interposed between said shaft and sleeve portions and being responsive to variations of pressure exerted upon said sleeve portion, a lever attached to and actuated by relative movements between the sleeve and shaft portions of the indentor-bar, due to shortening under pressure of the interposed spring, and having means including an adjustable screw and a stiff spring interposed between the bracket of said outer sleeve portion and screw, for varying the tension between the shaft portion and the first-mentioned stiff spring, screw-threaded means for eliminating at will the effect of the interposed stiff spring and automatically preventing the relative movement between the sleeve and shaft portions of the indentor-bar, and a depth-gage carried by the said lever and adapted to indicate depth of penetration of said pointed shaft portion of the indentor-bar.

26. In a device of the class described, the combination with a press-frame, a slide-bar carried thereby and movable therein, a pressure-gage carried by the slide-bar and having a plate-spring, a toothed dovetailed bar for said gage adapted to slide in the press-frame, a pinion for engaging the teeth of said bar, a fulcrum lever for said pinion, an indentor-bar slidable in said gage movable relatively thereto in the actuating of said plate-spring, said bar consisting of an outer sleeve portion and a shaft portion movable therein and carrying an indentor-point at its lower extremity, a yeildable member interposed between said sleeve and shaft portions, said yieldable member being responsive to variations of pressure upon said indentor-bar, means for eliminating at will the effect of the yieldable member, a depth-gage carried by the fulcrum lever for accurately indicating the depths of penetration of the indentor-point in various materials, and means for actuating said depth gage.

27. In a pressure-gage, in indentor-bar having a hollow stem and a solid bar movable therein and being provided with an indentor-point on its extremity, said indentor-bar being of telescopic construction, stiff yieldable means interposed between the solid bar and hollow stem, a fulcrum lever attached to and actuated by relative movements of the indentor-bar due to shortening under pressure of the interposed yieldable means, a depth-penetration measuring micrometer rigidly attached to one end of the fulcrum lever and having a slidable actuating member, and an adjustable sleeve surrounding the lower end of the indentor-bar and being adapted to rest upon and having fixed relation to the surface of the test specimen and to cooperate with the said slidable actuating member to record on the micrometer the depth of penetration motions of the indentor-bar when under pressure.

28. In a pressure-gage, a telescopic indentor-bar movable in said gage and having a hollow stem and a slidable solid bar and provided with a point at its extremity, stiff yieldable means interposed between the said stem and bar, a fulcrum lever attached to and actuated by relative movements of the indentor-bar, due to shortening under pressure of the interposed yielding means, a depth-penetration measuring-gage rigidly attached to the free end of the said lever and having a fixed dial and an indicating-hand, an adjustable sleeve on and near the lower end of the indentor-bar adapted to rest upon or have fixed relation to the surface of the test specimen, an adjustable collar carried by said sleeve for setting the indicator-hand to zero on the fixed dial and adapted in cooperation with said sleeve to communicate to the said gage the depth of penetration motions of the pointed indentor-bar and to register the same.

29. In a pressure-gage, an indentor-bar of telescopic arrangement having a hollow stem and a solid bar movable therein and provided with a super-hard point at its lower end, stiff yieldable compensating means interposed between said stem and bar, a fulcrum lever attached to and actuated by relative movements of the indentor-bar due to shortening under pressure of the interposed yieldable means, a depth-gage rigidly attached to the free extremity of the said lever and having a fixed dial and an indicating hand, a slidable adjustable sleeve surrounding the lower end of the indentor-bar and which sleeve is adapted to rest upon or have a fixed relation to the surface of the test specimen, an adjustable collar carried by said sleeve and adapted in cooperation with the sleeve to transmit to the said gage the depth of penetration motions of the pointed indentor-bar for registration on the dial of said gage.

30. In a pressure-gage, an indentor-bar of telescopic construction having a hollow stem and a solid bar therein, said solid bar being provided with an indentor-point at its extremity, stiff yieldable means interposed between the telescopic sections of the indentor-bar, a fulcrum lever attached to and actuated by relative movements of the indentor-bar due to shortening under pressure of the interposed yieldable means, a depth penetration measuring-gage rigidly attached to the free extremity of the said fulcrum lever, an adjustable slidable sleeve on and near the extremity of the indentor-bar, an adjustable collar for said sleeve, means for holding the solid bar of the indentor-bar in resilient contact with the interposed yieldable means and also for adjustably varying the tension of said means, and means for eliminating the interposed yieldable means at will, whereupon the indentor-bar automatically becomes a rigid and non-telescopic unit.

31. In a device of the class described, the combination with a press-frame, of a pressure-gage associated therewith, means for applying pressure to said gage from said press-frame, an indentor-bar having a hollow stem having an offset bracket at its lower end and a solid bar movable therein, the said solid bar having a pointed lower extremity, stiff spring means interposed between the said stem and bar, a lever pivotally mounted in the bracket of the hollow stem and fulcrumed in said solid bar, and a micrometer supported by the free end of said lever and adapted to be moved longitudinally to said indentor-bar assembly, responsive to variations of pressure and flexure of the interposed spring, and means for actuating said micrometer including an internally screw-threaded collar carried by an externally screw-threaded sleeve in contact with the specimen under test.

32. A telescopic member consisting of two intermediate portions, one of which is movable longitudinally within the other, a stiff spring interposed between said portions, a bracket attached to the lower end of one intermediate portion, a lever attached to the other intermediate portion and also pivotally connected to the said bracket, an adjustable screw, and a stiff member interposed between said screw and the lever, for holding one intermediate portion of the telescopic member in contact with the said stiff spring and for regulating the tension of said stiff spring.

33. A bar for a pressure-gage having a superhard point at its outer extremity, said extremity and its point being automatically shortened under increasingly high pressure, a depth micrometer-gage carried by said bar provided with indicating means, a movable sleeve adjacent to said superhard point having adjustable means for actuating and setting to zero the indicating means of the depth-gage, and lever reversing means for reversing the direction of said shortening relative to the said gage for the purpose of compensating for excessive depth registration caused by the automatic shortening of the superhard point and the outer extremity of said pressure-gage bar.

34. A bar for a pressure-gage provided with a superhard indentor-point on its outer extremity, a movable sleeve adjacent to said indentor-point provided with adjustable means for actuating and setting to zero a depth micrometer gage carried by said bar, which at its opposite portion is adapted to shorten under increasing pressure, and means for reversing the direction of said shortening motion relative to said depth-gage for the purpose of compensating for excessive depth registration due to the shortening of the said extremity and its superhard indentor-point when under high pressure.

35. In a device of the class described, the combination with a press-frame having means for exerting pressure, a pressure-gage movably carried by the press-frame, said pressure-gage having a weigher-spring, of an indentor-bar having an outer portion and an inner portion, and means for normally holding said indentor-bar out of contact with the weigher-spring of the pressure-gage.

36. In a device of the class described, the combination with a press-frame having means for exerting pressure, a pressure-gage movably carried by the press-frame, said pressure-gage having a weigher-spring, of an indentor-bar having two portions movable relatively to each other, and means for normally holding said indentor-bar out of contact with the weigher-spring of the pressure-gage.

In testimony whereof, I affix my signature.

ALBERT F. SHORE.